(12) United States Patent
Muehlhausen

(10) Patent No.: US 7,197,712 B2
(45) Date of Patent: Mar. 27, 2007

(54) SERVER VISUALIZATION AND CONTROL

(75) Inventor: John Muehlhausen, Chicago, IL (US)

(73) Assignee: Essex Radez LLC, Chicago, IL (US)

( * ) Notice: Subject to any disclaimer, the term of this patent is extended or adjusted under 35 U.S.C. 154(b) by 0 days.

(21) Appl. No.: 10/991,794

(22) Filed: Nov. 17, 2004

(65) Prior Publication Data

US 2005/0108650 A1   May 19, 2005

Related U.S. Application Data

(60) Provisional application No. 60/520,854, filed on Nov. 18, 2003.

(51) Int. Cl.
  *G06F 15/00* (2006.01)
  *G06F 13/00* (2006.01)
(52) U.S. Cl. .................. 715/743; 715/736; 715/740; 709/213
(58) Field of Classification Search ................ 715/848, 715/757, 849, 850, 853, 854, 842, 765, 763, 715/740, 743, 738, 749, 736, 737; 709/213, 709/209, 223, 224
  See application file for complete search history.

(56) References Cited

U.S. PATENT DOCUMENTS

| | | | |
|---|---|---|---|
| 5,838,906 | A | 11/1998 | Doyle |
| 6,466,971 | B1 | 10/2002 | Humpleman et al. |
| 6,480,882 | B1 | 11/2002 | McAdam |
| 6,731,314 | B1 * | 5/2004 | Cheng et al. ............... 715/848 |
| 2002/0138828 | A1 * | 9/2002 | Robohm et al. ............... 725/1 |
| 2003/0061279 | A1 | 3/2003 | Llewellyn |
| 2003/0204585 | A1 * | 10/2003 | Yao et al. .................... 709/224 |
| 2003/0217166 | A1 | 11/2003 | Dal Canto |
| 2004/0167840 | A1 * | 8/2004 | Tully et al. .................... 705/35 |

FOREIGN PATENT DOCUMENTS

| | | |
|---|---|---|
| CA | 2298003 | 8/2001 |
| WO | WO-3100609 | 12/2003 |

OTHER PUBLICATIONS

Microsoft ASP.NET: <http://www.asp.net/Default.aspx> and http://www.oreilly.com/catalog/aspdotnetnut2/toc.html.
Fidelity Active Trader Pro: <http://personal.fidelity.com/products/atp/content/tour.html>.
Citrix Metaframe: <http://www.citrix.com/site/ps/products.asp>.
Microsoft Terminal Services: <http://download.microsoft.com/download/2/8/1/281f4d94-ee89-4b21-9f9e-9accef44a743/TerminalServerOverview.doc>.

* cited by examiner

*Primary Examiner*—Cao (Kevin) Nguyen
(74) *Attorney, Agent, or Firm*—Perkins Coie LLP

(57) ABSTRACT

Methods and systems for server visualization and control are provided. In various embodiments, multiple clients connect to a server to receive various services from service providers, including financial services. When a client connects to a server, it provides authentication credentials to the server. The server, upon authenticating the client, may provide a set of additional credentials relating to service providers. These additional credentials may be used to receive services from the service providers. The client may connect to the services through a server visualization and control library resident on a server that provides a layer between clients and services such that an application developer who is developing a service may not need to be aware that multiple clients may connect to the service or that the service may be instantiated multiple times. A user may use the system in a variety of operating environments and may not perceive any differences when using the system on these operating environments because a server provides representations of a user interface to clients. The system may provide updates to connected clients without further client input.

22 Claims, 9 Drawing Sheets

Client: Respond_to_Event

Client: Receive_Update

SERVER VISUALIZATION AND CONTROL

CROSS-REFERENCE TO RELATED APPLICATION

This application claims the benefit of provisional U.S. patent application Ser. No. 60/520,854, filed Nov. 18, 2003, which is hereby incorporated by reference in its entirety.

TECHNICAL FIELD

The described technology relates generally to data communications and, more particularly, to server visualization and control.

BACKGROUND

Improvements in data communications technology have significantly affected the financial services industry. Coupled with the Internet, deregulation, and globalization of financial services, these improvements have enabled traders to participate in financial markets from virtually anywhere in the world. Technological improvements have also enabled various service providers to provide services to these traders, such as stock quotations, customized trading platforms, and automatic execution of trades based on trading models.

However, several problems exist despite these technological improvements. Providers of trading services generally create software programs for a variety of operating environments, such as MICROSOFT WINDOWS and APPLE MAC OS. Targeting software development efforts at multiple operating environments often requires duplicated development efforts, and so may be inefficient and expensive. Various operating environments or trading platforms may have different software languages with which developers may need to become familiar, thereby further increasing costs or delaying schedules. Even when the same programming language is used in different operating environments, the build environment for each may be substantially different. Some trading platforms may use network protocols that do not traverse network devices, such as firewalls or other security devices. When a cross-platform development tool that enables a software developer to target multiple operating environments changes its application program interface (API), an updated version of a run-time environment corresponding to the tool may need to be provided to all users. Moreover, when an application targets multiple operating environments and needs to be changed due to a bug fix or a business requirement change, subsequent programming, testing, building and distributing for each target platform may be an expensive task. A user may have different authentication credentials with each of several service providers that the user is receiving services from. Integrating services from these multiple service providers into a common trading application may require users to key in multiple credentials (i.e., one for each service provider). Thus, a system that solves these problems would have significant utility.

DETAILED DESCRIPTION

Figure 1:
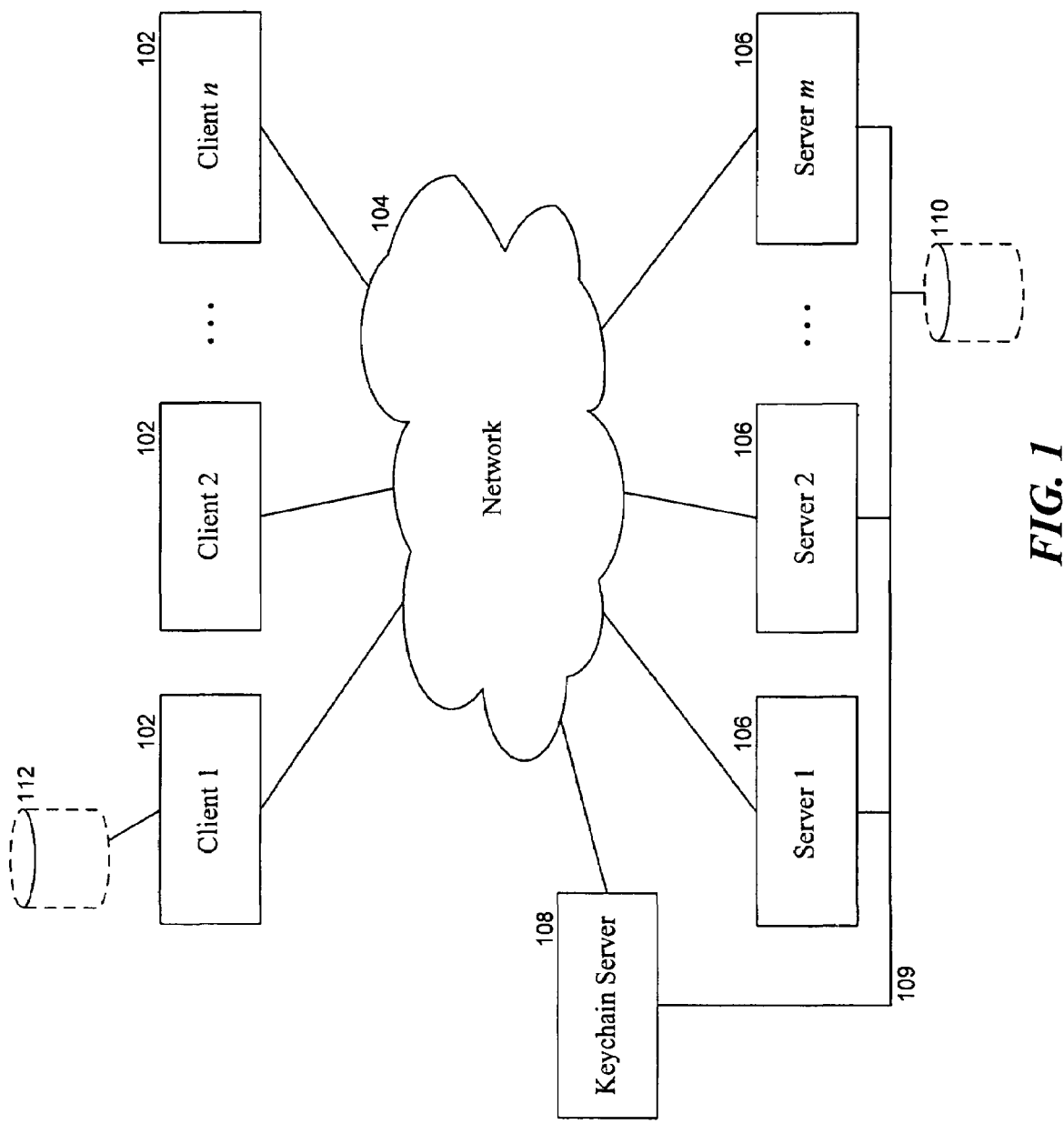
FIG. 1 is a block diagram illustrating components of a server visualization and control system in an embodiment.

Methods and systems for server visualization and control are provided. Server visualization includes displaying on a client a user interface defined at a server. Server control includes controlling a server to manipulate the user interface displayed on the client. In various embodiments, multiple clients connect to a server to receive various services from service providers, including financial services. When a client connects to a server, it provides authentication credentials to the server. These authentication credentials may have been received from a user of the client. The server, upon authenticating the client, may provide a set of additional credentials relating to service providers. These additional credentials may be used to receive services from the service providers. In various embodiments, clients may receive services from multiple service providers, and from multiple servers.

The client may connect to the services through a server visualization and control (SEVIC) library resident on a server. SEVIC provides a layer between clients and services such that an application developer who is developing a service may not need to be aware that multiple clients may connect to the service or that the service may be instantiated multiple times. SEVIC exposes an interface to clients through which the clients connect. SEVIC may also create multiple virtual users. Zero or more clients may map to a virtual user. The virtual user acts on behalf of the connected users to instantiate and receive services. Thus, SEVIC may act as a proxy for clients and services.

A user may use the system in a variety of operating environments including, e.g., MICROSOFT WINDOWS, APPLE MAC OS, UNIX with X-WINDOWS, and so on. The user may not perceive any differences when using the system on these operating environments because a server provides representations of a user interface (UI), such as script and data, to clients. Each client that receives these representations renders the UI based on the received information using a common application framework. The common application framework enables a software developer to target multiple operating environments without modifying programming logic substantially or at all.

Moreover, when a user uses the system on one client and then begins using the system on another client, the user may not perceive that the user has changed clients. To provide such seamless operation, a server may store various information received from a user or provided to the user. Then, when the user connects to the server from another client, the stored information may be provided to the newly connected client.

The system may provide updates to connected clients without further client input. As an example, when a service or service provider determines that a user interface element relating to the service needs to change, the service may automatically update the user interface of connected clients without input from the clients. This may be done by sending updates to the client, e.g., by invoking a remote procedure call on the client or scheduling to send the update with other information scheduled to be sent to clients.

The system may use a system-independent middle tier to enable communications between software components, such as a Common Object Request Broker Architecture (CORBA). The system may also use a cross-plafform application framework, such as Qt. The system may use these components in combination to enable software developers to provide services and applications to users that are platform independent. To combine these two frameworks, the system may use any of various scripting languages, such as CORBA script, ECMA script, or Qt's scripting language.

Turning now to the Figures, FIG. 1 is a block diagram illustrating components of a server visualization and control system in an embodiment. The system may comprise multiple client computing devices 102, a network 104, multiple servers 106, key chain servers 108, and databases 110 and 112. The servers, including the key chain servers, may be connected via a network 109. The database 110 may be coupled to the key chain servers and the servers via the network 109.

The clients and the servers are computing devices, and may have one or more processors, memory, operating systems, display devices, and associated peripherals.

The network 104 may be, e.g., an intranet, Internet, a combination of both, or any other type of network.

One or more clients may be coupled to the database 112 via a network (not shown). Alternatively, each client may have its own database (not shown).

Figure 2:
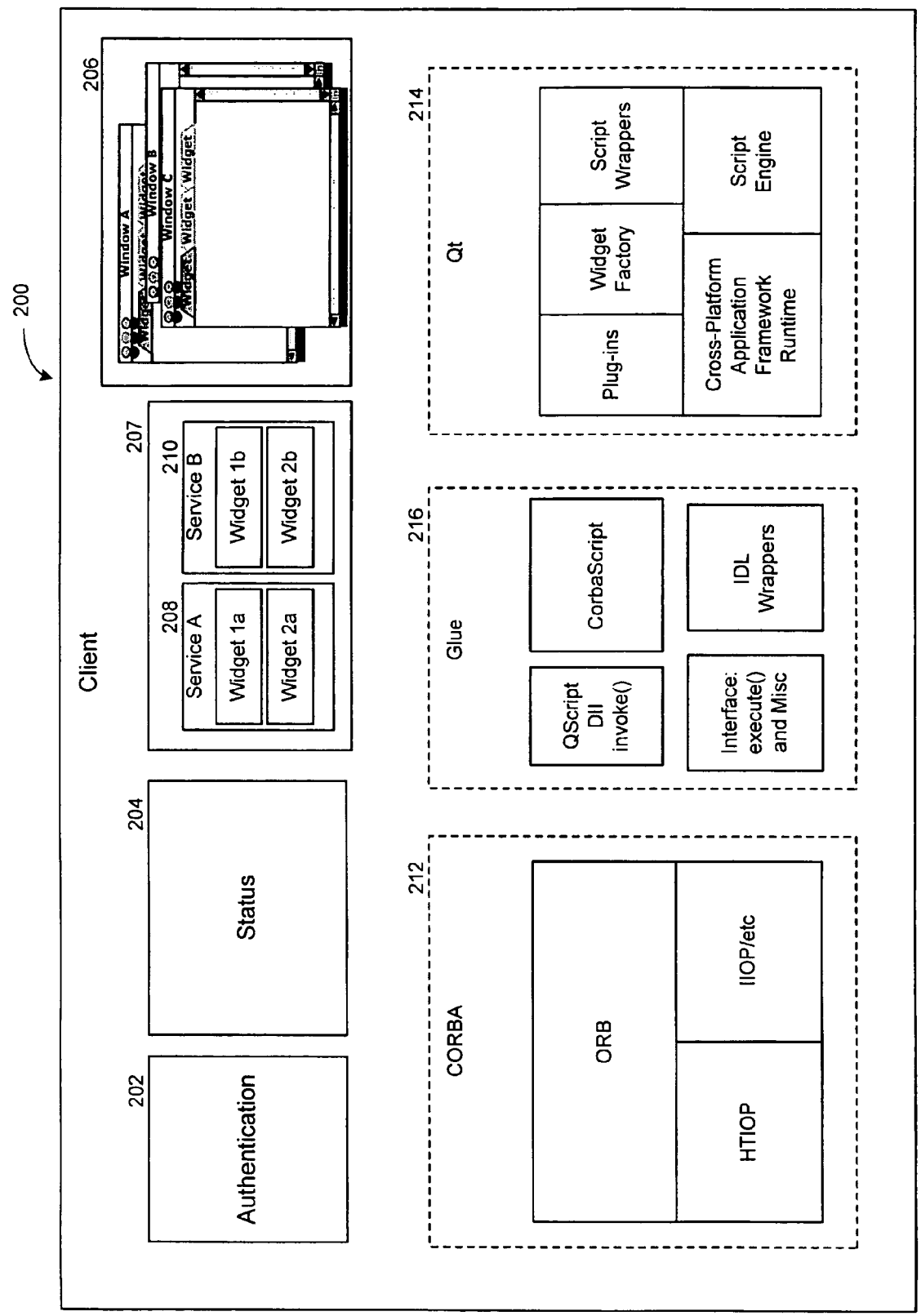
FIG. 2 is a block diagram illustrating components of a client of FIG. 1 in an embodiment.

FIG. 2 is a block diagram illustrating components of a client of FIG. 1 in an embodiment. The client comprises an authentication object 202, status object 204, display component 206, multiple service components 207, such as service components 208 and 210, CORBA components 212, Qt components 214, and multiple glue components 216, such as scripts and interface definitions.

The authentication object may authenticate a user, e.g., by receiving a user ID and password, and providing the received user ID and password to an authentication server, such as a key chain server. Upon authenticating the user, the authentication object may receive additional credentials for the user, e.g., to authenticate the user with various services. As an example, the authentication object may receive additional IDs and keys (or passwords) that may be required when attempting to connect to various services, e.g., to retrieve stock quotation information. As a further example, a user may have a user ID and password for a service, such as stock quotations, and may have a separate user ID and password for use with another service that provides news information. By using a key chain service, the user may only need to provide credentials once.

The authentication object may use either a key chain service that is coupled to the client or may use a key chain service that resides on a server, such as a key chain server. The user may be able to control a local key chain service connected to a client, such as to add or remove IDs and keys. On the other hand, a key chain service residing on a server may be administered by a system administrator of the server.

The status object may collect and provide information relating to latency and connection status. As an example, the status object may provide an indication of whether a client is connected to a service and network latency. The network latency may relate to all services. As an example, the status object may know that the received data is no older than the time at which the last update was received. In various embodiments, network latency may relate to a specific service. Thus, for example, the status object may be used to inform a user about how old a particular stock quotation is. The status object may also be used, e.g., by an application program, to connect to or disconnect from a service.

The display component may be used to provide a UI to a user. The display component may provide browser-like functions, such as to provide a UI to a user or receive indications from a user relating to the UI, e.g., to open or close windows, drag and drop pages between windows, manipulate window sizes and positions, provide user input, mark windows or pages as "always on top," and so on. Various such settings indicated by the user may be stored for access in a subsequent user session. These indications may be stored, e.g., in a key chain server or a database. In various embodiments, the system may use browser behavior provided by standard components, such as MICROSOFT INTERNET EXPLORER.

In various embodiments, the system may use a middle tier to enable inter-object communications. The illustrated embodiment uses a CORBA component 212 as a platform-independent middle-tier object that enables inter-object communications. CORBA defines an architecture for software components running on a variety of platforms to communicate with one another. Information relating to CORBA may be found at www.omg.org. The CORBA component may have one or more object request brokers (ORBs). An ORB is an agent that communicates with other agents. An ORB may use a variety of protocols to communicate with agents. As an example, an ORB may use an Internet Inter-ORB protocol (IIOP). ORBs may also communicate using a hypertext Inter-ORB protocol (HTIOP). HTIOP may be used when network devices prevent messages using IIOP to be sent or received. As an example, firewalls, network address translators, or other network components may prevent IIOP messages from traversing the network. As an example, a firewall in a network configuration may prevent a server from initiating a session with a client. HTIOP is designed to be used with a hypertext transfer protocol (HTTP), which is in ubiquitous use. Because HTIOP appears to be HTTP traffic to network devices, it is less likely to be impeded by network devices that manage network traffic, such as firewalls. Moreover, HTIOP maintains a client-initiated HTTP request open for as long as possible so that many messages may flow from the server to the client while being packaged and presented as an HTTP "response." HTIOP may automatically re-establish sessions whenever they are not present. This may be done at the ORB protocol layer. CORBA may be a registered trademark of OBJECT MANAGEMENT GROUP.

In various embodiments, the system may use a platform-independent application framework that provides a common UI "look and feel" across various operating systems. The illustrated embodiment uses a Qt application framework 214. Information about Qt can be found at www.trolltech.com. Qt is an application framework that enables cross-platform application development. Qt abstracts operating system functionality to provide a common UI across a variety of operating systems. As an example, an application written using Qt may function similarly in both MICROSOFT WINDOWS and APPLE's MAC OS. The Qt component may also provide a common UI API. In various embodiments, other cross-platform application development frameworks may be used. The Qt component comprises plug-ins, a widget factory, and script wrappers. The plug-ins, widget factory, and script wrappers utilize the functionality provided by a runtime of the cross-platform application framework and a script engine. Plug-ins and script extend functionality provided by the cross-platform application framework. Plug-ins are typically compiled executables, and scripts are typically interpreted at run-time by a script engine. The widget factory receives definition relating to how a UI should appear, such as in an extensible markup language (XML), and creates the user interface "widgets" at run-time based on these definitions. The widget factory may use built-in widgets or widgets provided by plug-ins. The definitions may reference these plug-ins. Qt may be a registered trademark of TROLLTECH.

The system may provide "glue" components to enable other components of the system to function together. As examples, the system provides scripts, such as scripts of the cross-platform application framework, interface definitions, and script wrappers for the interface definitions. As an example, an ORB may invoke a script of the client by calling an execute( ) method exposed by an interface. In various embodiments, public methods of the cross-platform application framework may be accessible by script functions. As an example, when using Qt, public methods of Qt may be available as "slots," such that scripts can access the public methods. Slots are a concept of Qt that receives signals from a caller. In other words, a slot is a recipient's connection point for an inter-object communication. The public methods may also be available to other components, such as CORBA components. As an example, a setText ( ) method of a LineEdit widget may have a CORBA interface definition language definition and may also be a "slot" for access from a script.

Services are generally resident on a server that may provide various services to a client. As an example, a stock quotation service may provide stock quotes. One or more windows of a UI may be associated with a service. Each window may be associated with one or more services. As an example, Service A may appear in windows A and B. Window B may provide information from Service A and Service C. Multiple widgets may also be associated with services. A widget is a UI control that provides and/or receives information. Multiple widgets may be associated with a window or service. As an example, a widget may display a stock quote and another may provide a chart showing historical trading information relating to the stock. Both widgets may be associated with a stock quotation service.

Figure 3:
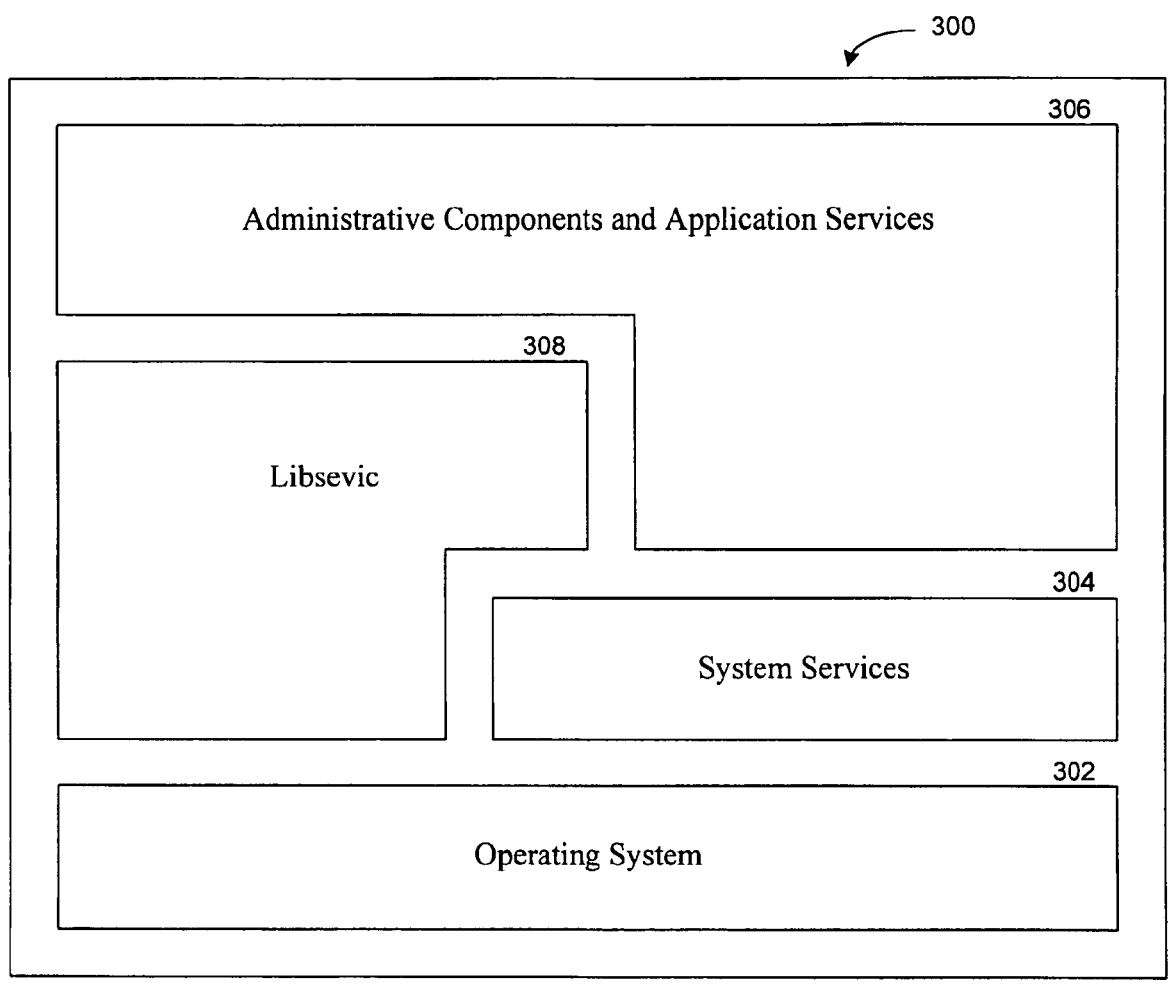
FIG. 3 is a block diagram illustrating components of a server in an embodiment.

FIG. 3 is a block diagram illustrating components of a server in an embodiment. The server 300 comprises an operating system 302, system services 304, administrative components and application services 306, and a libsevic component 308.

The operating system may be a standard operating system found in a variety of computing systems. Examples include, e.g., MICROSOFT WINDOWS, MAC OS, etc.

System services 304 may include applications and services that provide additional functionality beyond that provided by the operating system. As an example, system services may include cross-platform application frameworks, as described above in relation to FIG. 2. The system services may use facilities provided by the operating system.

Administrative components and application services include tools and applications of the server. Administrative components may be, e.g., tools that may be used by a system administrator to configure other components of the server, such as libsevic or system services. Application services comprise functionality provided by the server to other applications or computing systems. As an example, a stock quotation application service may use services provided by libsevic and system services to provide stock quotations to users using client computing devices.

The libsevic component is described in further detail immediately below in relation to FIG. 4. The libsevic component may utilize functionality provided by the operating system, system services, and other components of the server.

Figure 4:
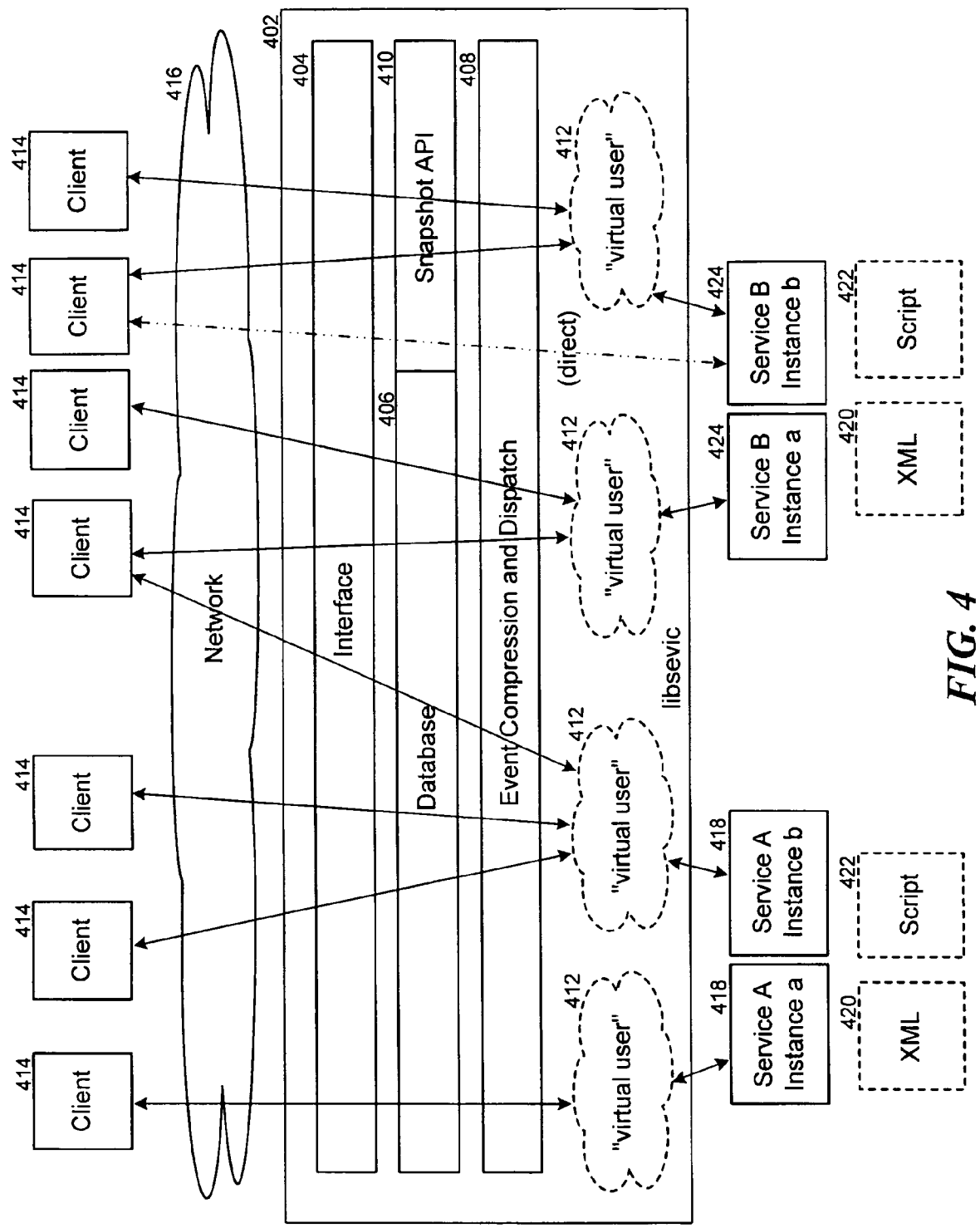
FIG. 4 is a block diagram illustrating components of the system in an embodiment.

FIG. 4 is a block diagram illustrating components of the system in an embodiment.

The system includes a libsevic component 402. Libsevic is a library for server visualization and control. It comprises an interface component 404, database component 406, event compression and dispatch component 408, snapshot application program interface 410, and multiple "virtual users" 412.

The interface component provides an interface to clients 414 that may avail of services of the server. A client may communicate via a network 416 to a server by calling a method provided by the interface component. As an example, a client may call a "registerclient" method to register itself. When a client registers, the system may retrieve information from the database and provide it to the client. As an example, the system may retrieve information relating to a prior session established by the client. The system may also store information in the database during a client's connection or session, such as events dispatched to the client.

Although the connection between the clients 414 and the server may not be persistent, libsevic maintains a "virtual user" 412 that may have a persistent connection to one or more services. A software developer providing a service 418 or 424 that uses libsevic to communicate with clients may then only have to provide application logic relating to providing a service to a single client. Libsevic would then virtualize this single client, such that multiple clients may access services. As an example, a service may provide stock quotes to libsevic, and libsevic can duplicate the stock quotes and provide the duplicated stock quotes to multiple users. Thus, clients can communicate indirectly with a service via libsevic.

As indicated by the dot dashed line, services may also communicate directly with connected clients, such as by using CORBA callback functions. As an example, a service may call a client's setText ( ) relating to a widget.

When a service is capable of providing information directly to a client when a client registers, the service may use the snapshot application program interface to provide the information. The service may use this facility to provide information rather than, or in addition to, the database.

The event compression and dispatch component may be used to send information, such as events, to clients. Services may indicate that various types of events may be compressed before sending the events to clients. By compressing events and updates, valuable processing and communications bandwidth can be saved. The compression feature is described below in further detail.

Libsevic may interface with multiple services concurrently, such as services 418 and 424. These services may utilize or be extended by data or commands residing in XML 420 or in script 422. As an example, XML data and script corresponding to a UI relating to a service may be provided by libsevic when a client requests a connection to the service.

Figure 5:
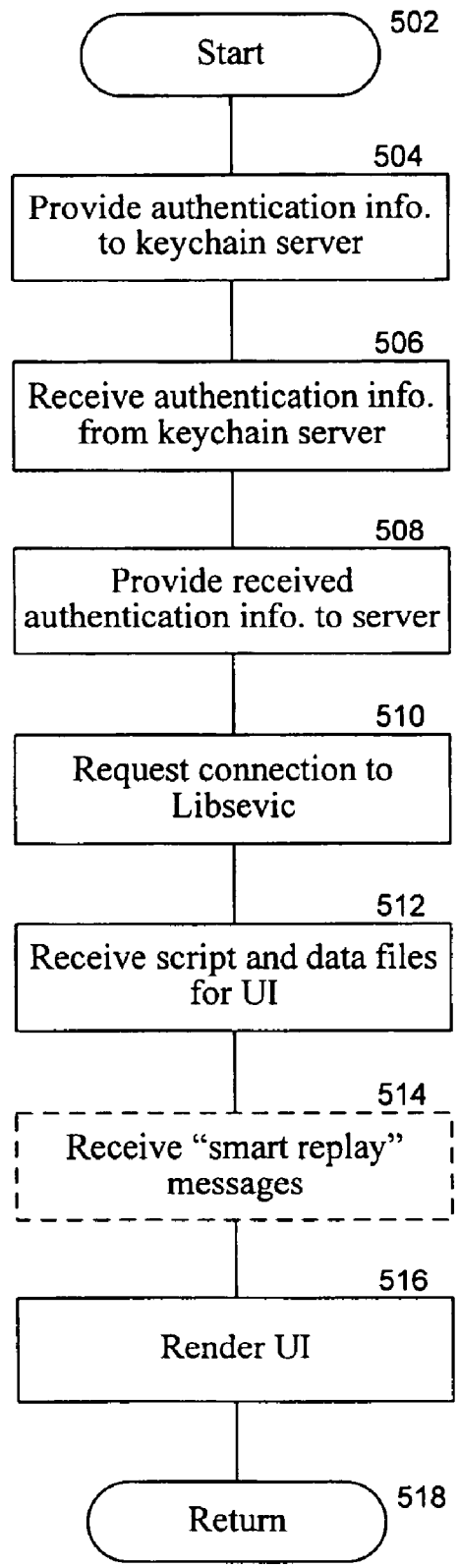
FIG. 5 is a flow diagram illustrating a receive_UI routine in an embodiment.

FIG. 5 is a flow diagram illustrating a receive_UI routine in an embodiment. The routine may be performed by a client.

The routine begins at block 502.

At block 504, the routine provides authentication information to a key chain server. The authentication information that the routine provides to the key chain server may have been received from a user.

At block 506, the routine receives additional authentication information from the key chain server. As an example, upon providing authentication information to the key chain server, the key chain server may provide authentication information, such as credentials, that may be used to authenticate the user with services.

At block 508, the routine provides the received authentication information to a server providing a service. As an example, at block 506, the routine may receive authentication information relating to a service that provides stock quotations. The routine may then provide the received authentication credentials for the stock quotation service to the server that provides stock quotations.

At block 510, the routine requests a connection to libsevic. As described above in relation to FIG. 4, when a client requests a connection to libsevic, it may send a message to register itself.

At block 512, upon registering itself, the client may receive script and data files relating to a UI from the server. The data may include XML data defining a UI and user preference. The scripts may include remote procedure calls (RPCs) to server methods. These RPCs may control (e.g., set or modify) variables stored on the server. The RPCs may also request updates. The script and data files may be used to generate the UI on the client.

At block 514, the routine may optionally receive "smart replay" messages. Smart replay messages may be used, e.g., to display information on a newly connected client that is similar, if not identical, to information displayed on a previously connected client. As a further example, a technical support representative who is helping a user may receive "smart replay" messages such that the technical support representative sees on his or her screen information that is identical to that displayed on the user's screen.

At block 516, the client renders the UI. Rendering the UI may include determining by a widget factory UI elements that need to be displayed on the screen. This may involve interpreting the script and data files received at block 512.

At block 518, the routine returns to its caller.

Figure 6:
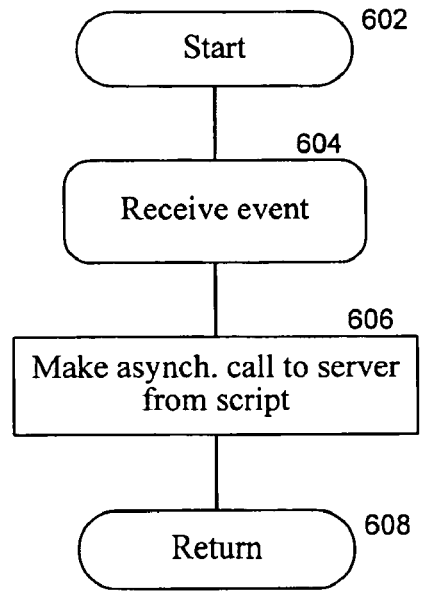
FIG. 6 is a flow diagram illustrating a respond_to_event routine in an embodiment.

FIG. 6 is a flow diagram illustrating a respond_to_event routine in an embodiment. The routine may be performed by a client computing system.

The routine begins at block 602.

At block 604, the routine receives an event. Examples of events may include an event generated by a software component, a user input, or a change in data.

At block 606, the routine makes an asynchronous call to the server from script. Because the client is making an asynchronous call, other routines or components of the client may not need to be blocked while waiting for the call to complete.

At block 608, the routine returns to its caller.

Figure 7:
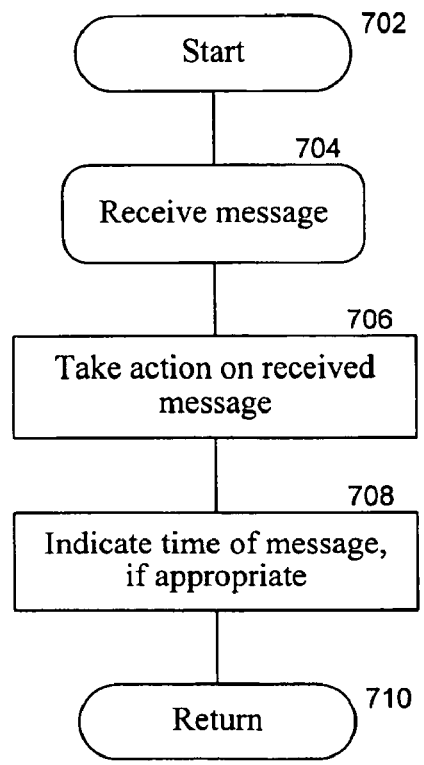
FIG. 7 is a flow diagram illustrating a receive_update routine in an embodiment.

FIG. 7 is a flow diagram illustrating a receive_update routine in an embodiment. The routine may be performed by a client computing device.

The routine begins at block 702.

At block 704, the routine receives a message from a server. The message may be received using HTIOP. Alternatively, the message may be received using any data communications protocol. The message may include updates to data, scripts, UI, code, or any other aspect of the client system.

At block 706, the routine takes action on the received message. Actions that may be taken may include, e.g., displaying received data, updating or adding script that may be called when an event occurs, storing data, and so on.

At block 708, the routine may indicate the time that the message was received, when appropriate. As an example, when new stock quotation information arrives, the routine may store and/or display when the last received quotation arrived. Thus, a user using the system may immediately know whether data displayed on a screen is up to date. In various embodiments, an approximate service delay may be calculated by libsevic and merely reported to the client.

At block 710, the routine returns to its caller.

Figure 8:
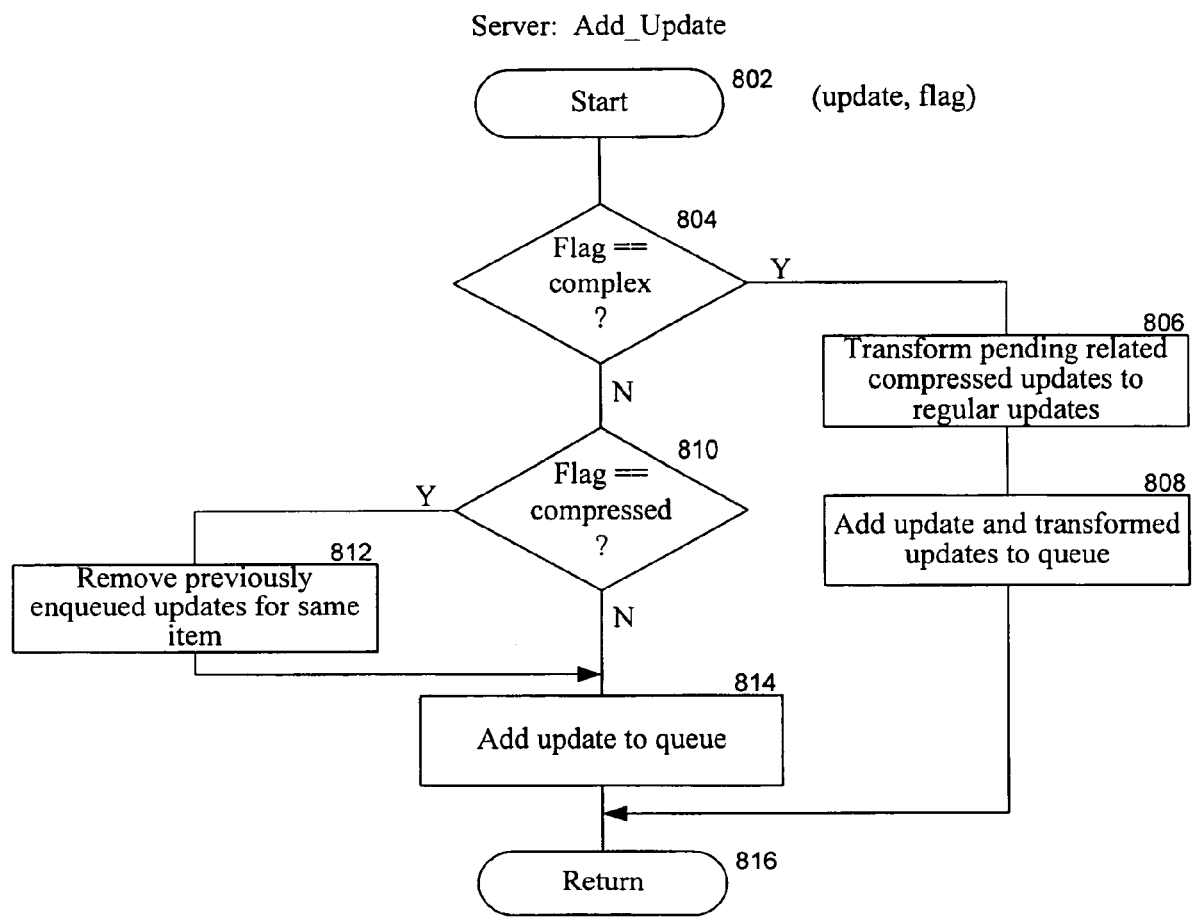
FIG. 8 is a flow diagram illustrating an add_update routine in an embodiment.

FIG. 8 is a flow diagram illustrating an add_update routine in an embodiment. The routine may be performed by a server computing system.

The routine begins at block 802, where it receives an update and a flag as parameters. An update may be an indication of an update to be sent to a client. The flag may be an indication of whether the update is to be sent in a manner that is normal, compressed, or complex.

At block 804, the routine determines whether the flag is indicated to be complex. An indication of complex may mean that other pending updates may need to be modified. As an example, when a shape of a table changes, an update relating to the change may be indicated to be complex. If the flag is indicated to be complex, the routine continues at block 806. Otherwise, the routine continues at block 810.

At block 806, the routine transforms pending related compressed updates to regular updates. Updates may be related when, e.g., they are associated with the same object. As an example, when an update relates to a table, updates to other rows, columns, or cells in the table may be related. Compressed updates are discussed in further detail below in relation to block 810.

At block 808, the routine adds the update indicated at block 802 to a queue of updates to be sent to connected clients.

At block 810, the routine determines whether the received flag indicates updates to be sent in compressed form. Compressed updates are not guaranteed to be delivered to clients. As an example, updates to a clock may not need to be sent to a client in a guaranteed manner. When updates can be compressed, the routine may remove prior pending updates to the same object or item. Thus, compressed updates are not guaranteed to be sent to connected clients. If the flag is indicated to be compressed, the routine continues at block 812. Otherwise, the routine continues at block 814. At block 812, the routine removes previously enqueued updates for the same item.

At block 814, the routine adds the update indicated at block 802 to the queue of updates to be sent to connected clients.

At block 816, the routine returns to its caller.

Figure 9:
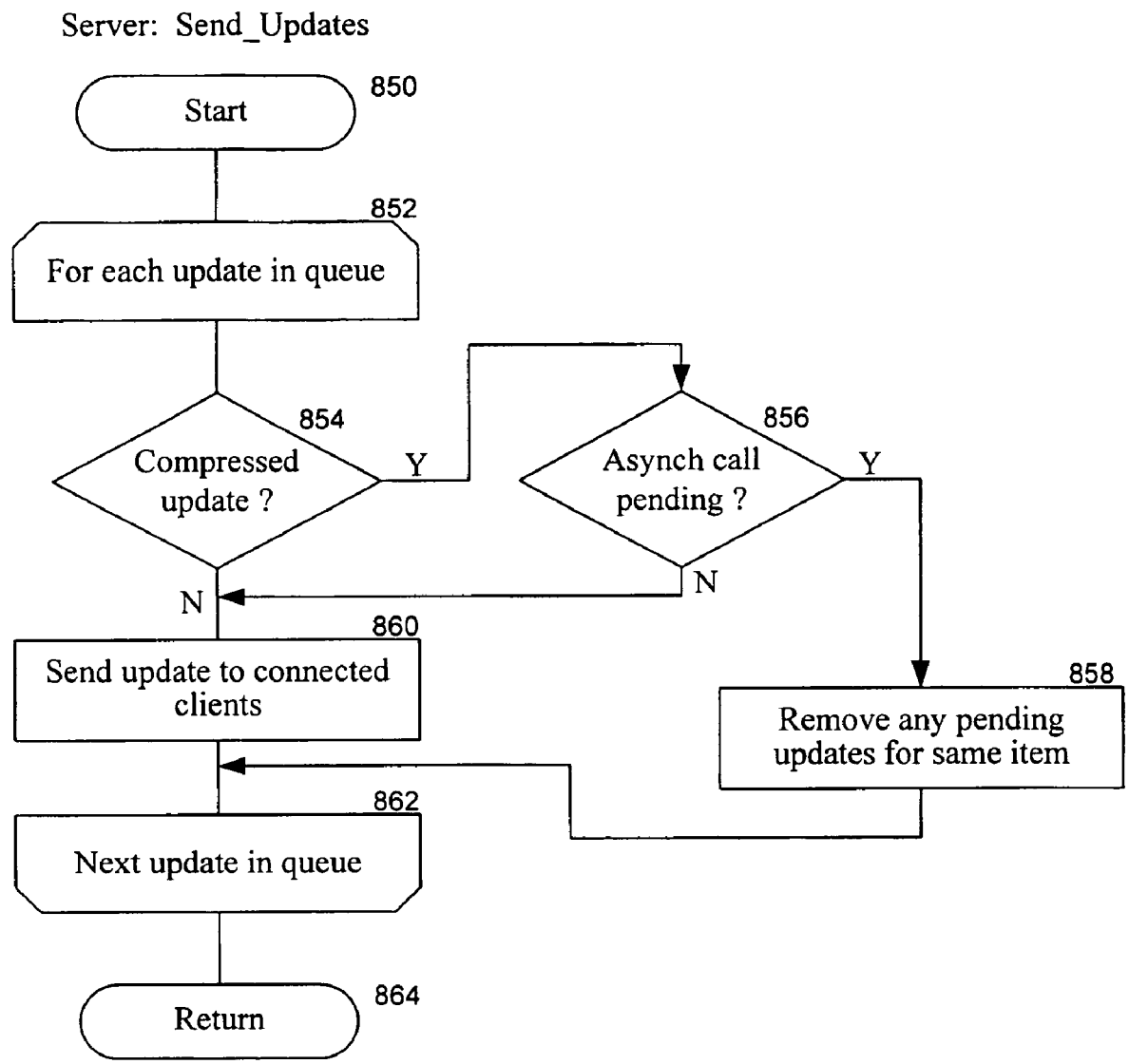
FIG. 9 is a flow diagram illustrating a send_updates routine in an embodiment.

FIG. 9 is a flow diagram illustrating a send_updates routine in an embodiment. The routine may be performed by a server computing system.

The routine begins at block 850.

Between blocks 852 and 862, the routine performs a number of steps in a loop for each pending update in a queue, e.g., for each connected client. At block 854, the routine determines whether a selected update in the queue is indicated to be compressed. If it is indicated to be compressed, the routine continues at block 856. Otherwise, the routine continues at block 860.

At block 856, the routine determines whether an asynchronous call is also pending. An asynchronous call may be pending when, e.g., a client or the server are communicating relating to an item.

At block 858, the routine replaces any pending updates for the same item from a queue of updates to be sent to connected clients. If any pending updates are replaced, these replaced updates may be sent to connected clients upon completion of the illustrated routine. The routine then continues at block 862.

At block 860, the routine sends the selected update to connected clients. In various embodiments, updates may be sent to one, some, or all connected clients.

At block 862, the routine selects the next update in the queue.

At block 864, the routine returns to its caller.

The routine may send updates tailored for each connected client.

Figure 10:
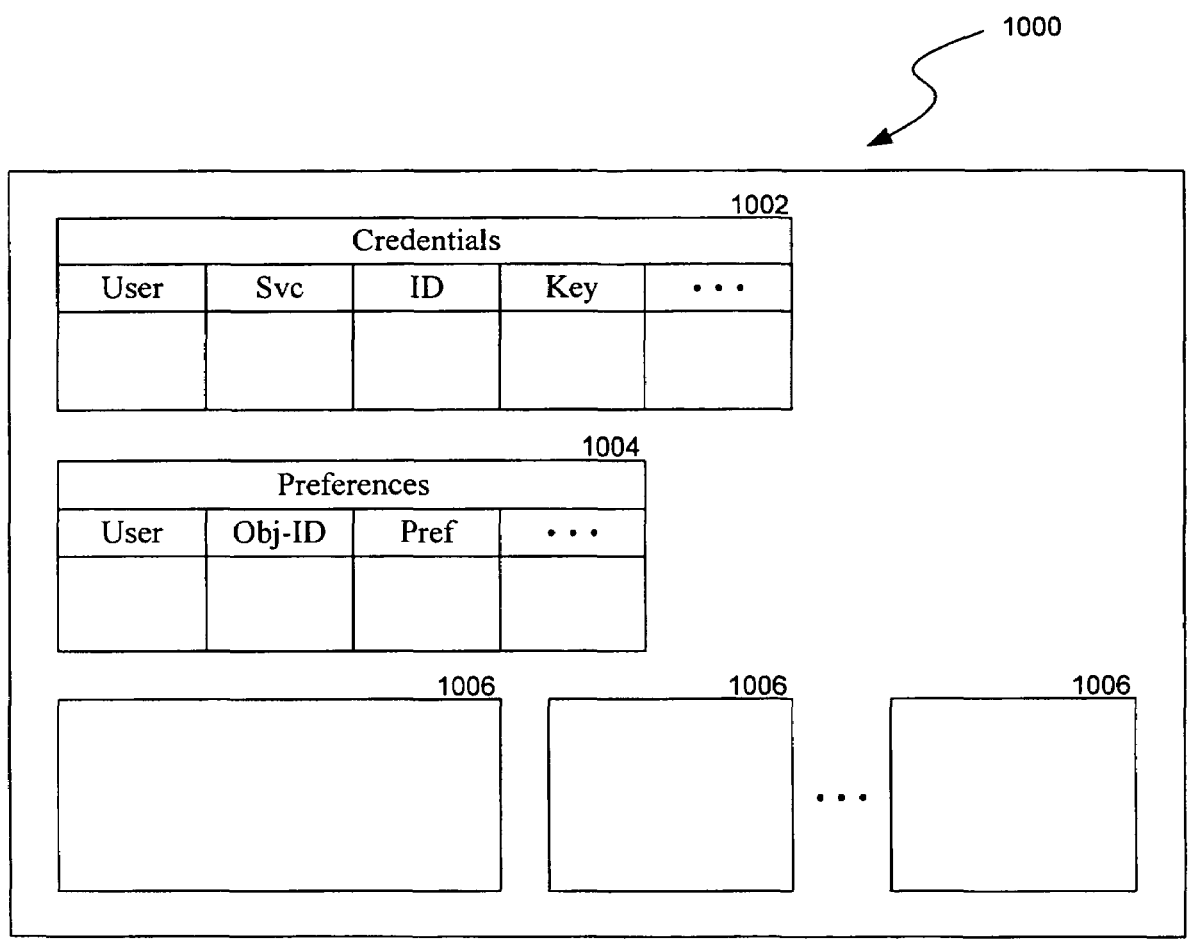
FIG. 10 is a block diagram illustrating a database associated with a key chain server in an embodiment.

FIG. 10 is a block diagram illustrating a database associated with a key chain server in an embodiment. The database 1000 comprises multiple tables.

A credentials table 1002 may store multiple credentials relating to a user. The credentials table may include multiple columns including, e.g., a user column, service column, identifier column, and key column. The user column may store an identification of the user. The service, identifier, and key columns may store credentials (e.g., identifier and key) relating to a service.

A preferences table 1004 may comprise multiple columns, including, e.g., a user column, object ID column, and a preference column. The preferences table may store user preferences such as window positions, window sizes, indications of which services to associate with the window, and so on. The user column identifies a user. The object ID column identifies an object associated with a preference indicated in the preference column. As an example, for user A, the preferences table may have a row for object X with an indication of preference Y.

The database may also comprise additional tables 1006.

In various embodiments, a standard generalized markup language may be used instead of, or in addition to, XML.

In various embodiments, script languages may be JavaScript (which may be a trademark of SUN MICROSYSTEMS), ECMAScript, VBScript (which may be a trademark of MICROSOFT CORPORATION), QSA (which may be a trademark of TROLLTECH), or a variety of other scripting languages.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method for generating a graphical user interface on a client computing device, the graphical user interface having a client component that communicates with a server component, comprising:
   connecting to a server computing device;
   requesting the graphical user interface from the server computing device;
   receiving a description of the graphical user interface, the description indicated by a markup language;
   generating the graphical user interface on the client computing device based on the received description, the generating performed by a cross-platform application framework;
   receiving via a remote procedure call an update to the graphical user interface without a subsequent request from the client computing device; and
   updating the graphical user interface on the client computing device based on the received update.

2. The method of claim 1 wherein the markup language is a standard generalized markup language.

3. The method of claim 1 wherein the markup language is an extensible markup language.

4. The method of claim 1 wherein the description includes script of a scripting language.

5. The method of claim 4 wherein the script includes the remote procedure call.

6. The method of claim 5 wherein the remote procedure call controls at least one variable of the server computing device.

7. The method of claim 5 wherein the remote procedure call requests an update.

8. The method of claim 7 wherein the update is requested from the server computing device.

9. The method of claim 7 wherein the update is requested from another server computing device.

10. The method of claim 1 wherein the cross-platform application framework is Qt.

11. The method of claim 1 including receiving a communication from the server component, the communication intended for the client component.

12. The method of claim 11 wherein the communication is handled by a Common Object Request Broker Architecture.

13. The method of claim 12 wherein the cross-platform application framework is Qt.

14. The method of claim 1 wherein the graphical user interface relates to a financial services application.

15. A system for providing a graphical user interface to a client computing device, the graphical user interface having a client component that communicates with a server component, comprising:
   a component that receives a connection request from the client computing device, the connection request identifying a user, the user having authentication credentials;
   a component that authenticates the user based on the authentication credentials;
   a component that provides a set of events previously sent to a client computing device on another connection for the authenticated user; and
   a component that provides via remote procedure calls to the authenticated user events generated after receiving the connection request without a subsequent request from the client computing device.

16. The system of claim 15 wherein at least one event generated after receiving the connection request is indicated to be compressed.

17. The system of claim 16 wherein prior to providing the at least one event indicated to be compressed, pending events related to the at least one event indicated to be compressed are removed from a queue.

18. The system of claim 15 wherein the at least one event generated after receiving the connection request is indicated to be complex.

19. The system of claim 18 wherein prior to providing the at least one event indicated to be complex, pending related events that are indicated to be compressed are marked to be no longer compressed.

20. The system of claim 15 including a database for storing events.

21. The system of claim 15 wherein another user connects to the server using a client to receive events sent to the authenticated user.

22. A computer-readable medium having computer-executable instructions for performing a method for generating a graphical user interface
on a client computing device, the graphical user interface having a client component that communicates with a server component, the method comprising:
connecting to a server computing device using a CORBA component;
requesting the graphical user interface from the server computing device;
receiving a description of the graphical user interface, the description indicated by a markup language;
generating the graphical user interface on the client computing device based on the received description, the generating performed by a Qt component;
receiving by the Qt component via a remote procedure call an update to the graphical user interface without a subsequent request from the client computing device; and
updating the graphical user interface on the client computing device based on the received update.

* * * * *

UNITED STATES PATENT AND TRADEMARK OFFICE
CERTIFICATE OF CORRECTION

PATENT NO. : 7,197,712 B2 Page 1 of 1
APPLICATION NO. : 10/991794
DATED : March 27, 2007
INVENTOR(S) : Muehlhausen It is certified that error appears in the above-identified patent and that said Letters Patent is hereby corrected as shown below:

In column 3, line 10, delete "cross-plafform" and insert -- cross-platform --, therefor.

In column 10, line 40, in Claim 15, delete "Asystem" and insert -- A system --, therefor.

Signed and Sealed this

Seventeenth Day of June, 2008

JON W. DUDAS
*Director of the United States Patent and Trademark Office*